US012695165B2

(12) United States Patent
Sasaki

(10) Patent No.: US 12,695,165 B2
(45) Date of Patent: Jul. 28, 2026

(54) BATTERY PACK

(71) Applicant: MURATA MANUFACTURING CO., LTD., Kyoto (JP)

(72) Inventor: Taichi Sasaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 542 days.

(21) Appl. No.: 18/226,578

(22) Filed: Jul. 26, 2023

(65) Prior Publication Data

US 2024/0097293 A1 Mar. 21, 2024

(30) Foreign Application Priority Data

Sep. 21, 2022 (JP) ................................. 2022-150264

(51) Int. Cl.
| | |
|---|---|
| *H01M 50/583* | (2021.01) |
| *H01M 10/42* | (2006.01) |
| *H01M 10/44* | (2006.01) |
| *H01M 10/48* | (2006.01) |
| *H01M 50/548* | (2021.01) |

(52) U.S. Cl.
CPC ..... *H01M 50/583* (2021.01); *H01M 10/4257* (2013.01); *H01M 10/443* (2013.01); *H01M 10/48* (2013.01); *H01M 50/548* (2021.01)

(58) Field of Classification Search
None
See application file for complete search history.

(56) References Cited

FOREIGN PATENT DOCUMENTS

| | | | | |
|---|---|---|---|---|
| JP | 2010123321 A | * | 6/2010 | .............. H02J 7/663 |
| JP | 2012249393 A | | 12/2012 | |

OTHER PUBLICATIONS

Iwata (JP 2010-123321 A), English Translation from FIT (Year: 2010).*

* cited by examiner

*Primary Examiner* — Colin W. Slifka
(74) *Attorney, Agent, or Firm* — K&L Gates LLP

(57) ABSTRACT

A battery pack capable of improving safety is obtained. A battery pack according to an embodiment of the present disclosure includes a secondary battery provided in a power supply path and including a positive electrode and a negative electrode, a first terminal connected to one end of the power supply path, a second terminal connected to the other end of the power supply path, a cutoff circuit provided in the power supply path and cutting off a current flowing through the power supply path, a discharge circuit connected to the positive electrode of the secondary battery and the negative electrode of the secondary battery and discharging the secondary battery, and a control circuit monitoring the secondary battery and causing the cutoff circuit to cut off the current and causing the discharge circuit to discharge the secondary battery when an abnormality is detected based on a monitoring result.

15 Claims, 7 Drawing Sheets

(A) SECONDARY BATTERY VOLTAGE VB (B) CONTROL SIGNAL CTL (A) SECONDARY BATTERY VOLTAGE VB (B) CONTROL SIGNAL CTL

BATTERY PACK

CROSS REFERENCE TO RELATED APPLICATIONS

The present application claims priority to Japanese patent application no. 2022-150264, filed on Sep. 21, 2022, the entire contents of which is incorporate herein by reference.

BACKGROUND

The present disclosure relates to a battery pack including a secondary battery.

In a battery pack including a secondary battery, when an abnormality occurs, there is a battery pack that performs protection so that the battery pack cannot be used permanently thereafter. Such protection is often also referred to as non-restoration protection. For example, a technique is described for notifying, when such an abnormality occurs in a battery pack, that charging and discharging cannot be performed using a light emitting diode (LED).

SUMMARY

The present disclosure relates to a battery pack including a secondary battery.

In the battery pack, when such an abnormality occurs, it is desired that the unusable battery pack can be more safely stored or more safely discarded, and further improvement in safety is expected.

It is desirable to provide a battery pack capable of improving the safety.

A battery pack according to an embodiment of the present disclosure includes a secondary battery, a first terminal, a second terminal, a cutoff circuit, a discharge circuit, and a control circuit. The secondary battery is provided in a power supply path and includes a positive electrode and a negative electrode. A first terminal is connected to one end of the power supply path. A second terminal is connected to the other end of the power supply path. The cutoff circuit is provided in the power supply path and can cut off a current flowing through the power supply path. The discharge circuit is connected to the positive electrode of the secondary battery and the negative electrode of the secondary battery, and can discharge the secondary battery. The control circuit can monitor the secondary battery, and when an abnormality is detected based on a monitoring result, the control circuit can cause the cutoff circuit to cut off the current and cause the discharge circuit to discharge the secondary battery.

A battery pack according to another embodiment of the present disclosure includes a secondary battery, a first terminal, a second terminal, a cutoff circuit, a discharge circuit, a temperature sensor, a second resistance element, and a control circuit. The secondary battery is provided in a power supply path and includes a positive electrode and a negative electrode. A first terminal is connected to one end of the power supply path. A second terminal is connected to the other end of the power supply path. The cutoff circuit is provided in the power supply path and can cut off a current flowing through the power supply path. The discharge circuit is connected to the positive electrode of the secondary battery and the negative electrode of the secondary battery, and can discharge the secondary battery. The temperature sensor can detect the temperature of the secondary battery. The second resistance element is provided in the power supply path. The control circuit can monitor the secondary battery, detection results of the temperature sensor, and a voltage between both ends of the second resistance element, and when an abnormality is detected based on the monitoring result, the control circuit can cause the cutoff circuit to cut off the current and cause the discharge circuit to discharge the secondary battery.

According to an embodiment of the present disclosure, the safety can be improved.

DETAILED DESCRIPTION

Hereinafter, one or more embodiments of the present disclosure will be described in further detail including with reference to the drawings.

Figure 1:
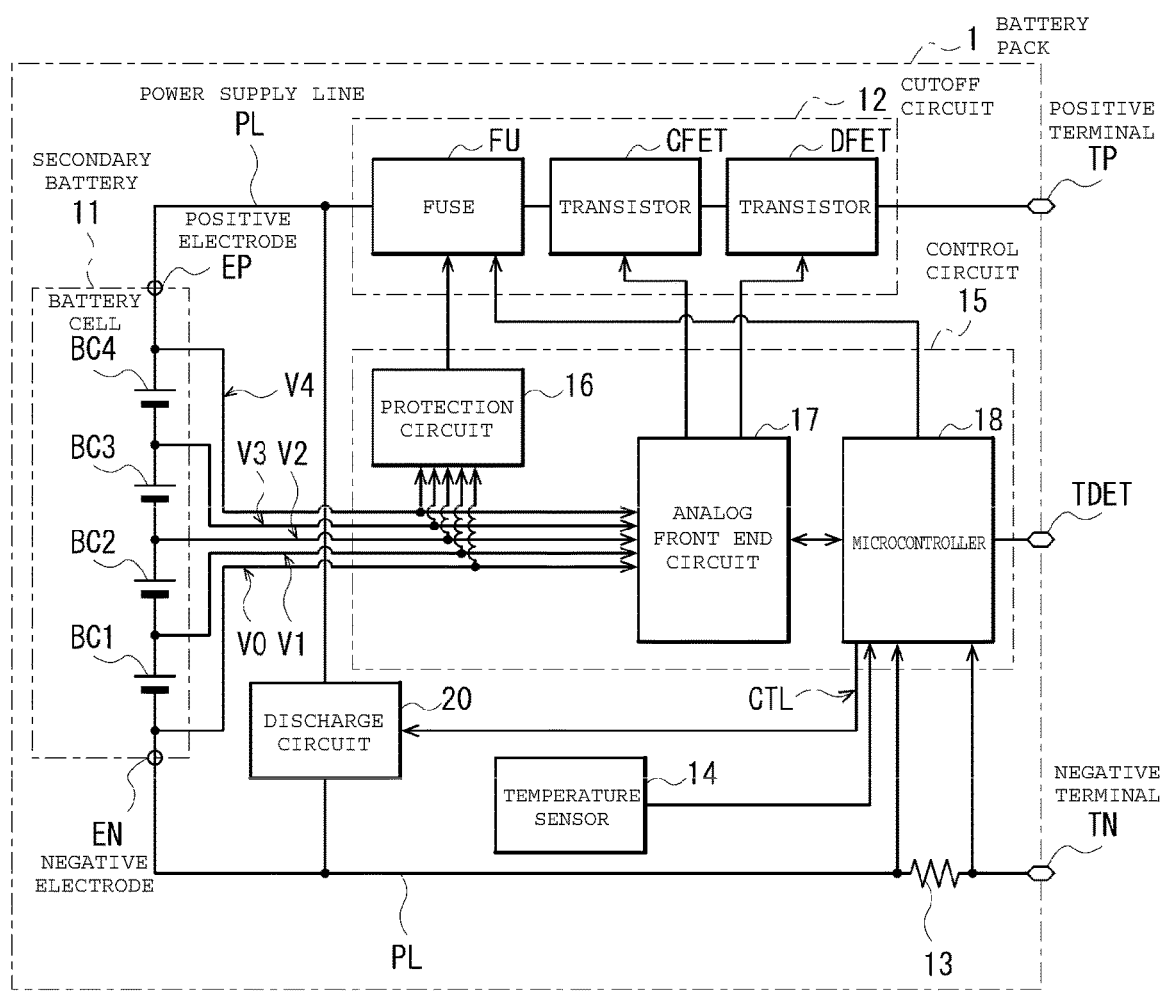
FIG. 1 is a block diagram illustrating a configuration example of a battery pack according to an embodiment of the present disclosure.

FIG. 1 illustrates a configuration example of a battery pack (battery pack 1) according to an embodiment. The battery pack 1 includes a positive terminal TP, a negative terminal TN, a terminal TDET, a secondary battery 11, a cutoff circuit 12, a resistance element 13, a temperature sensor 14, a control circuit 15, and a discharge circuit 20.

The positive terminal TP and the negative terminal TN are configured to exchange power between the battery pack 1 and a device to which the battery pack 1 is attached. The device may be, for example, a charger that supplies power to the battery pack 1 or a load device that operates based on the power of the battery pack 1. The positive terminal TP is guided to the positive electrode EP of the secondary battery 11 via a power supply line PL. The negative terminal TN is guided to the negative electrode EN of the secondary battery 11 via the power supply line PL.

The terminal TDET is a connection detection terminal for detecting that the battery pack 1 is attached to the device. For example, when the battery pack 1 is attached to a device, the terminal TDET is connected to a terminal of the device, and a voltage is supplied to the terminal TDET via the terminal. The battery pack 1 can detect that the battery pack 1 is attached to the device based on the voltage at the terminal TDET.

The secondary battery 11 is configured to store power. For example, when the battery pack 1 is connected to the charger, a charge current flows through the positive terminal TP, the cutoff circuit 12, the secondary battery 11, the resistance element 13, and the negative terminal TN in this order, whereby the secondary battery 11 is charged. When the battery pack 1 is connected to the load device, the discharge current flows through the negative terminal TN, the resistance element 13, the secondary battery 11, the cutoff circuit 12, and the positive terminal TP in this order, so that the secondary battery 11 is discharged.

The secondary battery 11 includes a plurality of battery cells BC (in this example, four battery cells BC1 to BC4). Each of the battery cells BC1 to BC4 is configured using a lithium ion secondary battery in this example. The battery cells BC1 to BC4 are connected in series. Specifically, the positive electrode of the battery cell BC1 is connected to the negative electrode of the battery cell BC2, and the negative electrode of the battery cell BC1 is connected to the negative electrode EN of the secondary battery 11. The positive electrode of the battery cell BC2 is connected to the negative electrode of the battery cell BC3, and the negative electrode of the battery cell BC2 is connected to the positive electrode of the battery cell BC1. The positive electrode of the battery cell BC3 is connected to the negative electrode of the battery cell BC4, and the negative electrode of the battery cell BC3 is connected to the positive electrode of the battery cell BC2. The positive electrode of the battery cell BC4 is connected to the positive electrode EP of the secondary battery 11, and the negative electrode of the battery cell BC4 is connected to the positive electrode of the battery cell BC3.

The voltage (cell voltage) between the negative electrode and the positive electrode in the battery cell BC can change according to a power storage amount in the battery cell BC. The battery pack 1 can be used when the cell voltage of each of the four battery cells BC is within a normal voltage range, and cannot be used when the cell voltage of any one or more battery cells BC of the four battery cells BC is outside the normal voltage range. For example, when the cell voltage exceeds the upper limit voltage of the normal voltage range, the battery cell BC is in a greatly overcharged state and cannot be used. For example, when the cell voltage falls below the lower limit voltage of the normal voltage range, the battery cell BC is in a deep discharge state and cannot be used. In the battery pack 1, the cell voltages of the four battery cells BC1 to BC4 are monitored by the control circuit 15.

The cutoff circuit 12 is provided in the power supply line PL and is configured to be able to cut off a current flowing through the power supply line PL. In this example, the cutoff circuit 12 is provided in a path connecting the positive terminal TP of the battery pack 1 and the positive electrode EP of the secondary battery 11 in the power supply line PL. The present disclosure is not limited to this configuration, and the cutoff circuit 12 may be provided in a path connecting the negative electrode EN of the secondary battery 11 and the negative terminal TN of the battery pack 1. The cutoff circuit 12 includes a transistor DFET, a transistor CFET, and a fuse FU. In this example, the transistor DFET, the transistor CFET, and the fuse FU are arranged in this order from the positive terminal TP of the battery pack 1 toward the positive electrode EP of the secondary battery 11.

The transistor DFET is, for example, an N-channel field effect transistor, and is configured to be able to be turned on and off based on the control voltage supplied from the control circuit 15. For example, when the secondary battery 11 should not be discharged, or when an abnormality occurs in the battery pack 1 and the battery pack 1 should not be used permanently thereafter, the transistor DFET is turned off based on the control voltage supplied from the control circuit 15. Accordingly, the transistor DFET cuts off the discharge current in the battery pack 1.

The transistor CFET is, for example, an N-channel field effect transistor, and is configured to be able to be turned on and off based on the control voltage supplied from the control circuit 15. For example, when the secondary battery 11 should not be charged, or when an abnormality occurs in the battery pack 1 and the battery pack 1 should not be used permanently thereafter, the transistor CFET is turned off based on the control voltage supplied from the control circuit 15. Accordingly, the transistor CFET cuts off the charge current in the battery pack 1.

The fuse FU is configured to be disconnectable based on a control signal supplied from the control circuit 15. For example, when an abnormality occurs in the battery pack 1 and the battery pack 1 should not be used permanently thereafter, the fuse FU is blown based on the control signal supplied from the control circuit 15 and enters a disconnected state. As a result, the fuse FU cuts off the current flowing through the power supply line PL.

The resistance element 13 is provided in the power supply line PL and is configured to generate a voltage corresponding to the current flowing through the power supply line PL. One end of the resistance element 13 is connected to the negative electrode EN of the secondary battery 11, and the other end is connected to the negative terminal TN of the battery pack 1. A voltage corresponding to the direction and the amount of current flowing through the resistance element 13 is generated between both ends of the resistance element 13. As described later, the control circuit 15 monitors the charge current and the discharge current of the battery pack 1 based on the voltage between both ends of the resistance element 13.

The temperature sensor 14 includes, for example, a thermistor, and is configured to detect the temperature of the battery pack 1. The temperature sensor 14 includes, for example, a plurality of temperature sensors. Specifically, the plurality of temperature sensors include, for example, a temperature sensor that is provided near the secondary battery 11 and detects the temperature of the secondary battery 11, and a temperature sensor that is provided on a substrate (not illustrated) of the battery pack 1 and detects the temperature of the substrate. Then, the temperature sensor 14 supplies a detection result to the control circuit 15.

The control circuit 15 is configured to monitor an operating state of the battery pack 1 and control the operations of the cutoff circuit 12 and the discharge circuit 20 based on the monitoring result. Specifically, the control circuit 15 monitors the cell voltages of the battery cells BC1 to BC4 based on the voltages V0 to V4 supplied from the secondary battery 11. The voltage V0 is the voltage of the negative electrode of the battery cell BC1, the voltage V1 is the voltage of the positive electrode of the battery cell BC1 and the negative electrode of the battery cell BC2, the voltage V2 is the voltage of the positive electrode of the battery cell BC2 and the negative electrode of the battery cell BC3, the voltage V3 is the voltage of the positive electrode of the battery cell BC3 and the negative electrode of the battery cell BC4, and the voltage V4 is the voltage of the positive electrode of the battery cell BC4. The control circuit 15 monitors the charge current and the discharge current of the battery pack 1 based on the voltage between both ends of the resistance element 13. The control circuit 15 monitors the temperature of the battery pack 1 based on the detection result of the temperature sensor 14. Then, the control circuit 15 controls the operations of the cutoff circuit 12 and the discharge circuit 20 based on the monitoring result.

The control circuit 15 includes a protection circuit 16, an analog front end circuit 17, and a microcontroller 18. In this example, these three circuits are each configured using an individual semiconductor chip. Although not illustrated, these circuits are connected to, for example, the positive electrode EP and the negative electrode EN of the secondary battery 11, and operate based on power supplied directly from the secondary battery 11. Thus, these circuits can operate regardless of the state of the cutoff circuit 12.

The protection circuit 16 is configured to monitor the cell voltages of the battery cells BC1 to BC4 based on the voltages V0 to V4 supplied from the secondary battery 11, and control the operation of the fuse FU based on the monitoring result. Specifically, for example, when at least one battery cell BC among the battery cells BC1 to BC4 is in the greatly overcharged state, the protection circuit 16 brings the fuse FU into the disconnected state. In this manner, the protection circuit 16 performs non-restoration protection.

The analog front end circuit 17 is configured to detect the voltages V0 to V4 supplied from the secondary battery 11 and supply the detection result to the microcontroller 18. Furthermore, the analog front end circuit 17 controls the operations of the transistors DFET and CFET based on an instruction from the microcontroller 18.

The microcontroller 18 is configured to monitor the cell voltages of the battery cells BC1 to BC4 based on the detection results of the voltages V0 to V4 supplied from the analog front end circuit 17, monitor the charge current and the discharge current of the battery pack 1 based on the voltage between both ends of the resistance element 13, and monitor the temperature of the battery pack 1 based on the detection result of the temperature sensor 14. The microcontroller 18 monitors connection between the battery pack 1 and the device based on the voltage at the terminal TDET. Then, based on the monitoring result, the microcontroller 18 controls the operations of the transistors DFET and CFET via the analog front end circuit 17, controls the operation of the fuse FU, and controls the operation of the discharge circuit 20.

Based on the monitoring result, the microcontroller 18 checks, for example, whether the secondary battery 11 should not be discharged or whether the secondary battery 11 should not be charged. The microcontroller 18 turns off the transistor DFET when the secondary battery 11 should not be discharged, and turns on the transistor DFET when the state where the secondary battery 11 should not be discharged is canceled. Furthermore, the microcontroller 18 turns off the transistor CFET when the secondary battery 11 should not be charged, and turns on the transistor CFET when the state where the secondary battery 11 should not be charged is canceled. In this way, the microcontroller 18 can perform restoration protection.

Based on the monitoring result, the microcontroller 18 checks, for example, whether or not an abnormality occurs in the battery pack 1 and the battery pack 1 should not be used permanently thereafter. When the battery pack 1 should not be used, the microcontroller 18 causes, for example, the cutoff circuit 12 to cut off the current, and causes the discharge circuit 20 to perform discharge operation. Thereafter, the microcontroller 18 maintains the state of the cutoff circuit 12. In this way, the microcontroller 18 can perform non-restoration protection. Hereinafter, the non-restoration protection will be described with some examples.

For example, the microcontroller 18 can judge that the battery cell BC is in the deep discharge state by monitoring the cell voltages of the battery cells BC1 to BC4. Specifically, for example, when at least one of the battery cells BC1 to BC4 is equal to or less than a predetermined threshold voltage (for example, 1 V), the microcontroller 18 judges that the battery cell BC is in the deep discharge state. Then, the microcontroller 18 turns off the transistors DFET and CFET via the analog front end circuit 17, and thereafter maintains the transistors DFET and CFET in the off state.

For example, the microcontroller 18 can judge that a cell balance error has occurred by monitoring variations in the cell voltages of the battery cells BC1 to BC4. Specifically, for example, when a difference between a maximum voltage and a minimum voltage among the four cell voltages of the battery cells BC1 to BC4 is equal to or more than a predetermined threshold voltage, the microcontroller 18 judges that the cell balance error has occurred. Then, the microcontroller 18 turns off the transistors DFET and CFET via the analog front end circuit 17, and thereafter maintains the transistors DFET and CFET in the off state.

For example, the microcontroller 18 can judge that the battery cell BC is abnormal by monitoring the cell voltages of the battery cells BC1 to BC4 and the charge current of the battery pack 1. For example, when the cell voltage of at least one of the battery cells BC1 to BC4 is reduced against charging performed, the microcontroller 18 judges that the battery cell BC is abnormal. Then, the microcontroller 18 turns off the transistors DFET and CFET via the analog front end circuit 17, and thereafter maintains the transistors DFET and CFET in the off state.

For example, the microcontroller 18 can judge that the transistors DFET and CFET have failed by monitoring the charge current and the discharge current of the battery pack 1. For example, when a current is flowing although both the transistors DFET and CFET are in the off state, the microcontroller 18 judges that at least one of the transistors DFET and CFET has failed. Then, the microcontroller 18 brings the fuse FU into the disconnected state.

For example, the microcontroller 18 can judge that the temperature sensor 14 has failed by monitoring the temperature of the battery pack 1. For example, when the detection result of at least one of the plurality of temperature sensors in the temperature sensor 14 is significantly different from the detection results of the other temperature sensors, the microcontroller 18 judges that the temperature sensor has failed. Then, the microcontroller 18 turns off the transistors DFET and CFET via the analog front end circuit 17, and thereafter maintains the transistors DFET and CFET in the off state.

For example, the microcontroller 18 can judge that the battery cell BC has reached the end of its life by monitoring the number of times of charging based on the cell voltages of the battery cells BC1 to BC4, and the charge current and the discharge current of the battery pack 1. For example, the microcontroller 18 increments a count value of the number of times of charging, for example, when the power storage amount in the secondary battery 11 increases by a predetermined amount or more, and judges that the secondary battery 11 has reached the end of its life when the count value reaches a predetermined count value. Although the example of the number of times of charging has been described above, it may be judged that the secondary battery 11 has reached the end of its life by monitoring the number of times of discharging. In this case, for example, the microcontroller 18 increments a count value of the number of times of discharging, for example, when the power storage amount in the secondary battery 11 decreases by a predetermined amount or more, and judges that the secondary battery 11 has reached the end of its life when the count value reaches a predetermined count value. Then, the microcontroller 18 turns off the transistors DFET and CFET via the analog front end circuit 17, and thereafter maintains the transistors DFET and CFET in the off state.

In this manner, the microcontroller 18 performs various types of non-restoration protection based on the monitoring result. When performing such non-restoration protection, the microcontroller 18 supplies a control signal CTL to the discharge circuit 20 to cause the discharge circuit 20 to perform the discharge operation of discharging the secondary battery 11.

The discharge circuit 20 is connected to the positive electrode EP and the negative electrode EN of the secondary battery 11, and is configured to perform the discharge operation of discharging the secondary battery 11 based on the control signal CTL supplied from the microcontroller 18.

Figure 2:
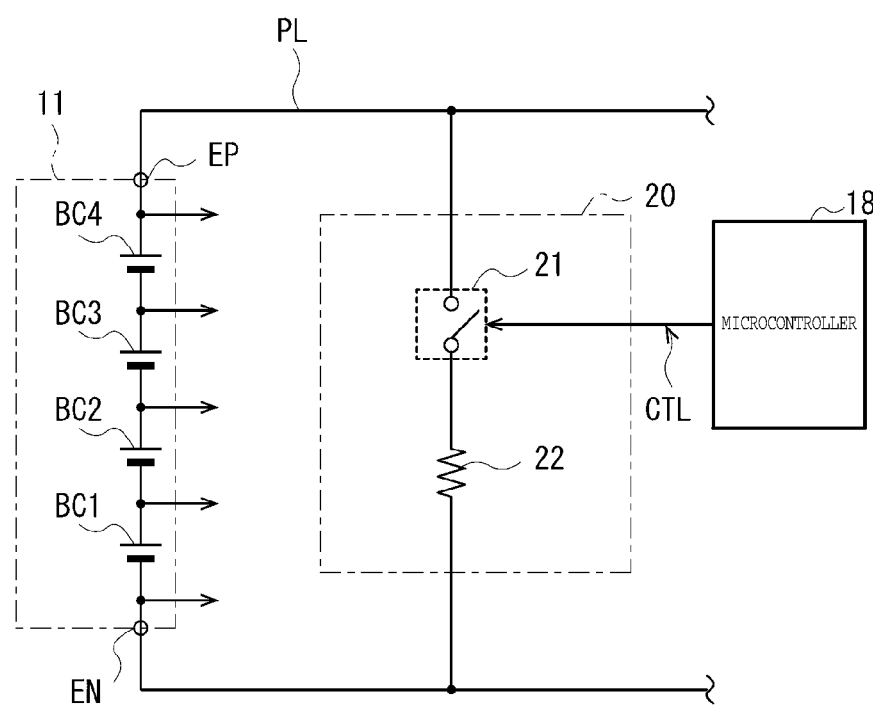
FIG. 2 is a circuit diagram illustrating a configuration example of a discharge circuit illustrated in FIG. 1.

FIG. 2 illustrates a configuration example of the discharge circuit 20. In FIG. 2, the secondary battery 11 and the microcontroller 18 are also illustrated for convenience of description. The discharge circuit 20 includes a switch 21 and a resistance element 22.

The switch 21 is configured using, for example, a transistor, and is configured to be able to be turned on and off based on the control signal CTL supplied from the microcontroller 18. One end of the switch 21 is connected to the positive electrode EP of the secondary battery 11, and the other end of the switch 21 is connected to the resistance element 22.

One end of the resistance element 22 is connected to the other end of the switch 21, and the other end of the resistance element 22 is connected to the negative electrode EN of the secondary battery 11. The resistance value of the resistance element 22 is set to a small value within a range in which a current value of the current flowing through the resistance element 22 does not exceed a rated condition of a maximum discharge current of the secondary battery 11. As a result, in the discharge circuit 20, the current in the discharge operation can be increased, and the discharge can be performed in a short time.

With this configuration, when the battery pack 1 performs non-restoration protection, the switch 21 is turned on based on the control signal CTL supplied from the microcontroller 18. As a result, a current flows through the positive electrode EP of the secondary battery 11, the switch 21, the resistance element 22, and the negative electrode EN of the secondary battery 11 in this order, the secondary battery 11 is discharged, and the power storage amount in the secondary battery 11 can be reduced. As a result, the battery pack 1 that is not used in the future can be stored more safely or discarded more safely.

Here, the secondary battery 11 corresponds to a specific example of a "secondary battery" in the present disclosure. The battery cell BC corresponds to a specific example of a "battery cell" in the present disclosure. The positive terminal TP corresponds to a specific example of a "first terminal" in the present disclosure. The negative terminal TN corresponds to a specific example of a "second terminal" in the present disclosure. The power supply line PL corresponds to a specific example of a "power supply path" in the present disclosure. The cutoff circuit 12 corresponds to a specific example of a "cutoff circuit" in the present disclosure. The fuse FU corresponds to a specific example of a "fuse" in the present disclosure. The transistors DFET and CFET each correspond to a specific example of a "cutoff switch" in the present disclosure. The discharge circuit 20 corresponds to a specific example of a "discharge circuit" in the present disclosure. The resistance element 22 corresponds to a specific example of a "first resistance element" in the present disclosure. The switch 21 corresponds to a specific example of a "switch" in the present disclosure. The control circuit 15 corresponds to a specific example of a "control circuit" in the present disclosure. The temperature sensor 14 corresponds to a specific example of a "temperature sensor" in the present disclosure. The resistance element 13 corresponds to a specific example of a "second resistance element" in the present disclosure.

Next, the operation and effects of the battery pack 1 of the present embodiment will be described according to an embodiment.

First, an operation of the battery pack 1 will be described with reference to FIG. 1 according to an embodiment. The secondary battery 11 stores electric power. The cutoff circuit 12 cuts off the current flowing through the power supply line PL. The transistors DFET and CFET of the cutoff circuit 12 are turned on and off based on the control voltage supplied from the control circuit 15, and the fuse FU enters the disconnected state based on the control signal supplied from the control circuit 15. The temperature sensor 14 detects the temperature of the battery pack 1. The control circuit 15 monitors the operating state of the battery pack 1 and control the operations of the cutoff circuit 12 and the discharge circuit 20 based on the monitoring result. The discharge circuit 20 performs the discharge operation of discharging the secondary battery 11 based on an instruction from the control circuit 15.

Figure 3:
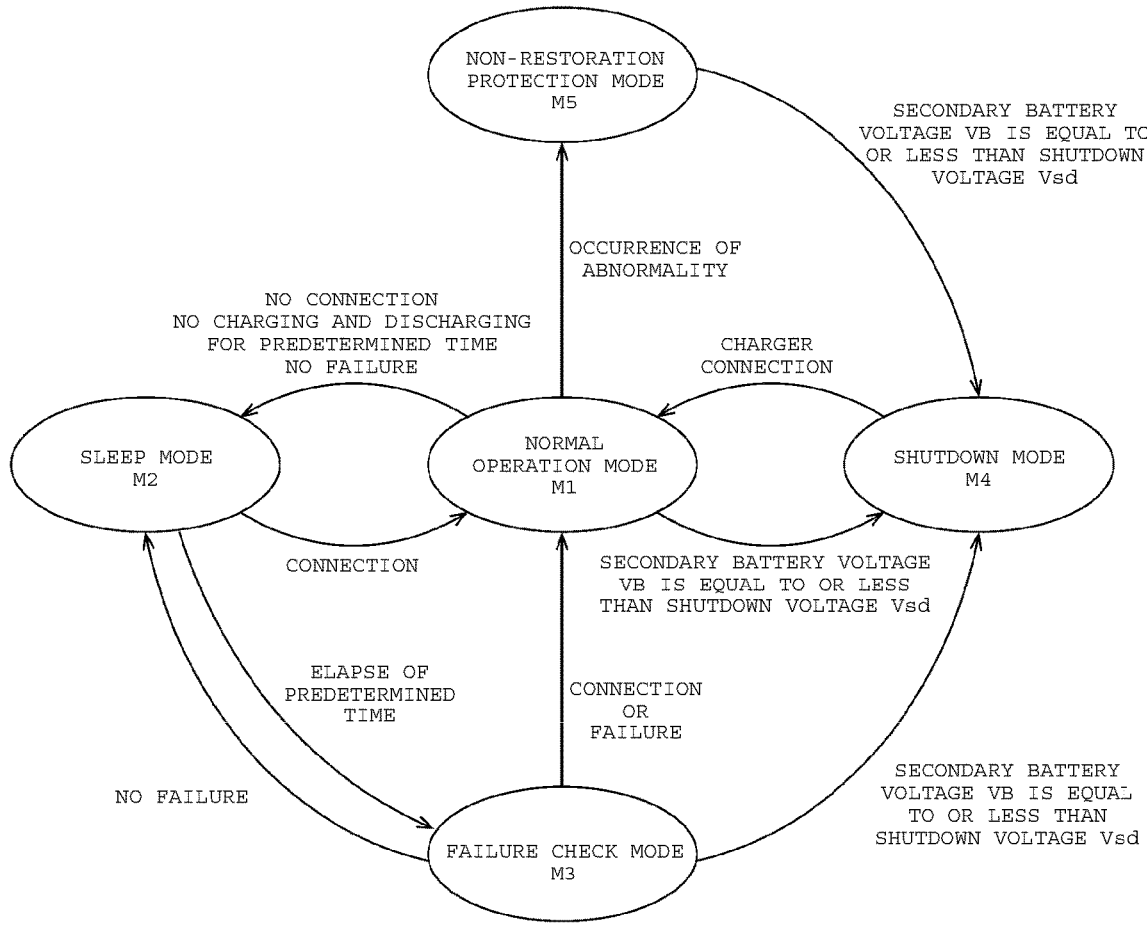
FIG. 3 is a state transition diagram illustrating an operation example of the battery pack illustrated in FIG. 1.

FIG. 3 illustrates a state transition diagram of the battery pack 1. The battery pack 1 has five operation modes M (normal operation mode M1, sleep mode M2, failure check mode M3, shutdown mode M4, and non-restoration protection mode M5).

The normal operation mode M1 is, for example, a mode in which the battery pack 1 performs charging and discharging when the battery pack 1 is connected to a device. In the normal operation mode M1, the control circuit 15 monitors the cell voltage, the charge current, the discharge current, and the temperature, monitors the connection between battery pack 1 and the device, and turns on and off the transistors DFET and CFET based on the monitoring result.

For example, when the battery pack 1 is connected to a charger, the battery pack 1 operates in the normal operation mode M1, and charges the secondary battery 11 based on the power supplied from the charger. At this time, for example, when the temperature of the secondary battery 11 becomes higher than a predetermined temperature or the charge current is larger than a predetermined current, the control circuit 15 judges that the secondary battery 11 should not be charged, and turns off the transistor CFET. As a result, the charge current is cut off. Then, when such a state where the secondary battery 11 should not be charged is canceled, the control circuit 15 turns on the transistor CFET. That is, the battery pack 1 performs restoration protection in the normal operation mode M1.

When a load device is connected to the battery pack 1, the battery pack 1 operates in the normal operation mode M1, and supplies the power stored in the secondary battery 11 to the load device. At this time, for example, when the temperature of the secondary battery 11 becomes higher than a predetermined temperature or the discharge current is larger than a predetermined current, the battery pack 1 judges that the secondary battery 11 should not be discharged, and turns off the transistor DFET. As a result, the discharge current is cut off. Then, when such a state where the secondary battery 11 should not be discharged is canceled, the control circuit 15 turns on the transistor DFET. That is, the battery pack 1 performs restoration protection in the normal operation mode M1.

When the operation mode M of the battery pack 1 is the normal operation mode M1, the microcontroller 18 changes the operation mode M from the normal operation mode M1 to the sleep mode M2 when the battery pack 1 is not connected to the device, charging and discharging are not performed for a predetermined time or more, and there is no failure in the battery pack 1. The failure includes a failure that is a target of restoration protection and a failure (abnormality) that is a target of non-restoration protection.

The sleep mode M2 is an operation mode in which the operation is substantially stopped except for some functions when the battery pack 1 is not connected to the device. In the sleep mode M2, the control circuit 15 does not monitor the cell voltage, the charge current, the discharge current, and the temperature, monitors the connection between the battery pack 1 and the device, and turns off the transistors DFET and CFET. Thus, in the battery pack 1, the power consumption can be reduced.

When the operation mode M of the battery pack 1 is the sleep mode M2 and the battery pack 1 is connected to the device, the microcontroller 18 changes the operation mode M from the sleep mode M2 to the normal operation mode M1.

When the operation mode M of the battery pack 1 is the sleep mode M2 and a predetermined time has elapsed, the microcontroller 18 changes the operation mode M from the sleep mode M2 to the failure check mode M3. The failure check mode M3 is an operation mode for checking whether there is a failure in the battery pack 1. The failure includes a failure that is a target of restoration protection and a failure (abnormality) that is a target of non-restoration protection. In the failure check mode M3, the control circuit 15 monitors the cell voltage, the charge current, the discharge current, and the temperature, monitors the connection between the battery pack 1 and the device, and turns off the transistors DFET and CFET. When there is no failure in the battery pack 1, the microcontroller 18 returns the operation mode M from the failure check mode M3 to the sleep mode M2. Thus, the battery pack 1 intermittently operates in the failure check mode M3 to check the failure. Accordingly, in the battery pack 1, it is possible to reduce the power consumption while monitoring the state of the battery pack 1 in the sleep mode M2 and the failure check mode M3.

When the operation mode M of the battery pack 1 is the failure check mode M3, when the battery pack 1 is connected to the device, or when there is a failure in the battery pack 1, the microcontroller 18 changes the operation mode M from the failure check mode M3 to the normal operation mode M1.

When the operation mode M of the battery pack 1 is the normal operation mode M1 or the failure check mode M3 and the voltage (secondary battery voltage VB) between the positive electrode EP and the negative electrode EN of the secondary battery 11 is equal to or less than a shutdown voltage Vsd, the microcontroller 18 changes the operation mode M to the shutdown mode M4.

The shutdown mode M4 is an operation mode in which the operation is definitely stopped when the battery pack 1 is not connected to the device. In the sleep mode M2, for example, the control circuit 15 definitely stops the operation and turns off the transistors DFET and CFET. Thus, in the battery pack 1, the power consumption can be reduced.

When the operation mode M of the battery pack 1 is the shutdown mode M4 and the battery pack 1 is connected to the charger, the battery pack 1 is activated, and the microcontroller 18 sets the operation mode M to the normal operation mode M1.

When the operation mode M of the battery pack 1 is the normal operation mode M1 and an abnormality of the battery pack 1 is detected, the microcontroller 18 changes the operation mode M from the normal operation mode M1 to the non-restoration protection mode M5.

The non-restoration protection mode M5 is an operation mode in which the cutoff circuit 12 cuts off the current and the discharge circuit 20 performs the discharge operation. In the non-restoration protection mode M5, the control circuit 15 turns off the transistors DFET and CFET, and brings the fuse FU into the disconnected state according to the occurred abnormality. Then, the control circuit 15 operates the discharge circuit 20 to discharge the secondary battery 11. As a result, the voltage (secondary battery voltage VB) between the positive electrode EP and the negative electrode EN of the secondary battery 11 decreases.

When the operation mode M of the battery pack 1 is the non-restoration protection mode M5 and the secondary battery voltage VB of the secondary battery 11 becomes equal to or less than the shutdown voltage Vsd, the microcontroller 18 changes the operation mode M from the non-restoration protection mode M5 to the shutdown mode M4.

Figure 4:
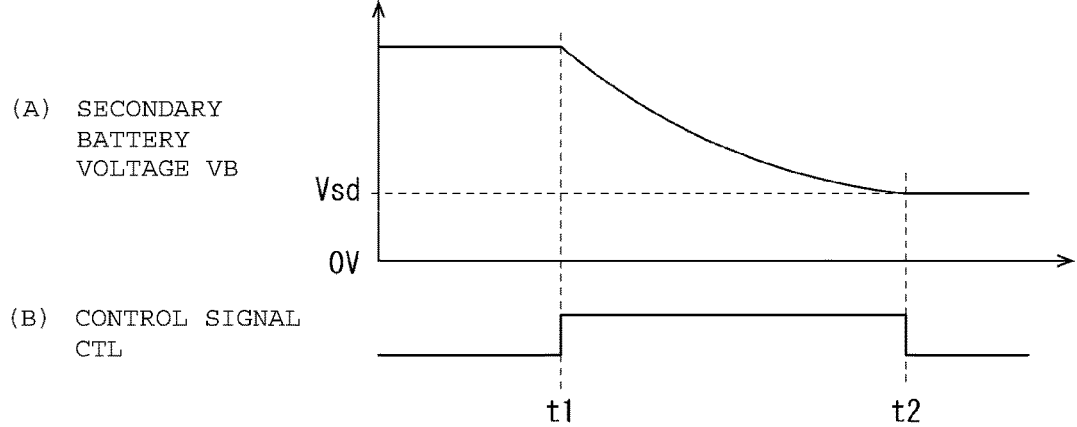
FIG. 4 is a timing waveform diagram illustrating an operation example of the discharge circuit illustrated in FIG. 1.

FIG. 4 illustrates an example of the discharge operation of the discharge circuit 20, in which (A) illustrates a waveform of the voltage (secondary battery voltage VB) between the positive electrode EP and the negative electrode EN of the secondary battery 11, and (B) illustrates a waveform of the control signal CTL supplied from the microcontroller 18. In this example, the switch 21 of the discharge circuit 20 is turned on when the control signal CTL is at a high level, and is turned off when the control signal CTL is at a low level.

In this example, the microcontroller 18 detects an abnormality of the battery pack 1 based on the monitoring result, and sets the operation mode M to the non-restoration protection mode M5. Then, the microcontroller 18 causes the cutoff circuit 12 to cut off a current, and changes the control signal CTL from the low level to the high level at timing t1 (FIG. 4(B)). As a result, the switch 21 of the discharge circuit 20 is turned on, a current flows through the positive electrode EP of the secondary battery 11, the switch 21, the resistance element 22, and the negative electrode EN of the secondary battery 11 in this order, and the discharge of the secondary battery 11 starts. As a result, the secondary battery voltage VB decreases as time elapses (FIG. 4(A)). As the secondary battery voltage VB decreases, the current flowing through the resistance element 22 of the discharge circuit 20 gradually decreases, so that a degree of change in the secondary battery voltage VB gradually decreases.

When the secondary battery voltage VB reaches the shutdown voltage Vsd at timing t2, the microcontroller 18 changes the operation mode M to the shutdown mode M4 and changes the control signal CTL from the high level to the low level (FIG. 4(B)).

In this manner, the discharge circuit 20 discharges the secondary battery 11 in the period between the timings t1 and t2. Thus, in the battery pack 1, the storage amount in the secondary battery 11 can be reduced. As a result, the battery pack 1 that is not used in the future can be stored more safely or discarded more safely.

As described above, in the battery pack 1, the secondary battery 11 provided in the power supply line PL and including the positive electrode EP and the negative electrode EN, the positive terminal TP connected to one end of the power supply line PL, the negative terminal TN connected to the other end of the power supply line PL, the cutoff circuit 12 provided in the power supply line PL and capable of cutting off the current flowing through the power supply line PL, the discharge circuit 20 connected to the positive electrode EP of the secondary battery 11 and the negative electrode EN of the secondary battery 11 and capable of discharging the secondary battery 11, and the control circuit 15 capable of monitoring the secondary battery 11 and causing the cutoff circuit 12 to cut off the current and causing the discharge circuit 20 to discharge the secondary battery 11 when an abnormality is detected based on the monitoring result are provided. With this configuration, the safety can be improved.

That is, when an abnormality occurs in the battery pack 1 as described above, the current is cut off by the cutoff circuit 12 in order to make the battery pack 1 unusable. In this case, since the power storage amount of the secondary battery 11 is maintained, when the power storage amount of the secondary battery 11 is large, a state of high energy is maintained. Thus, when the battery pack 1 in such a state is stored as it is or discarded, the safety may be reduced. In the battery pack 1, the secondary battery 11 is discharged by the discharge circuit 20 when an abnormality occurs in the battery pack 1. As a result, the storage amount of the secondary battery 11 can be reduced, so that the energy can be lowered. Thus, in the battery pack 1, since the battery pack 1 that is not used in the future can be stored more safely or discarded more safely, the safety can be improved.

In the battery pack 1, the discharge circuit 20 includes the resistance element 22 and the switch 21 connected in series with the resistance element 22. When an abnormality is detected, the control circuit 15 discharges the secondary battery 11 by turning on the switch 21. Thus, in the battery pack 1, the safety can be enhanced with a simple configuration.

In the battery pack 1, the secondary battery 11 includes the plurality of battery cells BC, and the control circuit 15 monitors the cell voltage in each of the plurality of battery cells BC and monitors the current flowing through the secondary battery 11. As a result, the control circuit 15 can confirm various abnormalities in the battery pack 1.

Specifically, for example, the control circuit 15 can check whether one or more of the plurality of battery cells BC are in the greatly overcharged state based on the cell voltage in each of the plurality of battery cells BC. For example, the control circuit 15 can check whether one or more of the plurality of battery cells BC are in the deep discharge state based on the cell voltage in each of the plurality of battery cells BC. Further, for example, the control circuit 15 can check whether the cell voltage variation in each of the plurality of battery cells BC is large based on the cell voltage in each of the plurality of battery cells BC. Further, for example, the control circuit 15 can check whether the cell voltage of one or more of the plurality of battery cells BC decreases against charging performed, based on the cell voltage in each of the plurality of battery cells BC and the current flowing through the secondary battery 11. Further, for example, the control circuit 15 can check whether a component included in the battery pack 1 has failed. Specifically, for example, based on the current flowing through the secondary battery 11, the control circuit 15 can judge that the transistors DFET and CFET have failed when a current is flowing although both the transistors DFET and CFET are in the off state. Furthermore, for example, the control circuit 15 can check whether the number of times of charging or discharging the secondary battery 11 is equal to or more than a predetermined number of times, based on the cell voltage in each of the plurality of battery cells BC and the current flowing through the secondary battery 11.

As described above, in the present embodiment, the secondary battery provided in the power supply line and including the positive electrode and the negative electrode, the positive terminal connected to one end of the power supply line, the negative terminal connected to the other end of the power supply line PL, the cutoff circuit provided in the power supply line and capable of cutting off the current flowing through the power supply line, the discharge circuit connected to the positive electrode of the secondary battery and the negative electrode of the secondary battery and capable of discharging the secondary battery, and the control circuit capable of monitoring the secondary battery and causing the cutoff circuit to cut off the current and causing the discharge circuit to discharge the secondary battery when an abnormality is detected based on the monitoring result are provided, and therefore, the battery pack 1 that is not used in the future can be stored more safely or discarded more safely, so that the safety can be improved.

In the present embodiment, the discharge circuit includes the resistance element and the switch connected in series with the resistance element. When an abnormality is detected, the control circuit discharges the secondary battery by turning on the switch. Thus, the safety can be enhanced with a simple configuration.

In the present embodiment, the secondary battery includes the plurality of battery cells, and the control circuit monitors the cell voltage in each of the plurality of battery cells and monitors the current flowing through the secondary battery; therefore, since various abnormalities of the battery pack can be checked, the safety can be enhanced.

In the above embodiment, when detecting an abnormality of the battery pack 1, the microcontroller 18 sets the control signal CTL supplied to the discharge circuit 20 to the high level; however, the present disclosure is not limited to this configuration. For example, the microcontroller 18 may set the control signal CTL to the high level when the abnormality of the battery pack 1 is detected and the temperature of the secondary battery 11 is within a predetermined temperature range. Hereinafter, the present variation will be described in detail.

Figure 5:
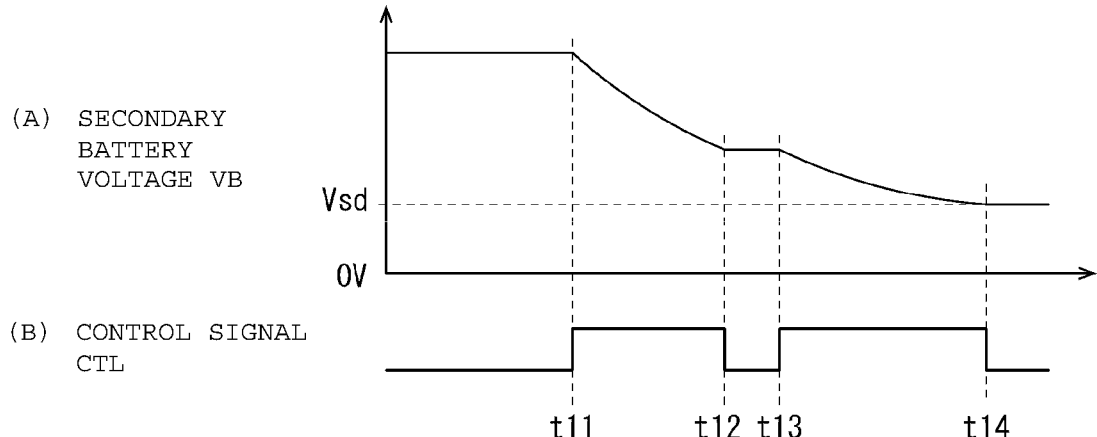
FIG. 5 is a timing waveform diagram illustrating an operation example of the discharge circuit according to a variation.
Figure 6:
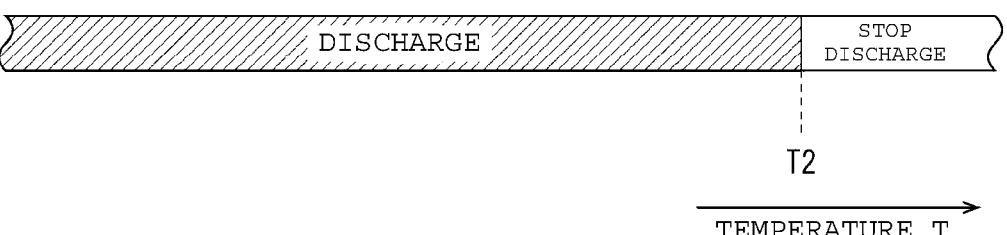
FIG. 6 is an explanatory diagram illustrating an example of a temperature range in which a discharge operation is performed.

FIG. 5 illustrates an operation example of the discharge circuit 20 according to an embodiment. FIG. 6 illustrates an example of a temperature range in which the discharge circuit 20 operates. In this example, the microcontroller 18 causes the discharge circuit 20 to perform the discharge operation when the temperature of the secondary battery 11 is equal to or lower than a temperature T2, and does not cause the discharge circuit 20 to perform the discharge operation when the temperature of the secondary battery 11 is higher than the temperature T2. The temperature T2 may be, for example, an upper limit value of a rated condition of an operating temperature of the secondary battery 11.

In the example of FIG. 5, the microcontroller 18 detects an abnormality of the battery pack 1 based on the monitoring result, and sets the operation mode M to the non-restoration protection mode M5. Then, the microcontroller 18 causes the cutoff circuit 12 to cut off a current, and changes the control signal CTL from the low level to the high level at timing t11 (FIG. 5(B)). As a result, the switch 21 of the discharge circuit 20 is turned on, a current flows through the positive electrode EP of the secondary battery 11, the switch 21, the resistance element 22, and the negative electrode EN of the secondary battery 11 in this order, and the discharge of the secondary battery 11 starts. As a result, the secondary battery voltage VB decreases as time elapses (FIG. 5(A)).

In this example, at timing t12, the temperature of the secondary battery 11 exceeds the temperature T2, and the microcontroller 18 changes the control signal CTL from the high level to the low level (FIG. 5(B)). As a result, the switch 21 of the discharge circuit 20 is turned off, the discharge of the secondary battery 11 is stopped, and the decrease in the secondary battery voltage VB is stopped (FIG. 5(A)).

In this example, at timing t13, the temperature of the secondary battery 11 becomes equal to or lower than the temperature T2, and the microcontroller 18 changes the control signal CTL from the low level to the high level (FIG. 5(B)). As a result, the switch 21 of the discharge circuit 20 is turned on, the discharge of the secondary battery 11 is resumed, and the decrease in the secondary battery voltage VB is resumed (FIG. 5(A)).

When the secondary battery voltage VB reaches the shutdown voltage Vsd at timing t14, the microcontroller 18 changes the operation mode M to the shutdown mode M4 and changes the control signal CTL from the high level to the low level (FIG. 5(B)).

As described above, in the battery pack 1 according to the present variation, when detecting an abnormality, the control circuit 15 causes the discharge circuit 20 to discharge the secondary battery 11 when the temperature of the secondary battery 11 is within a predetermined temperature range. As a result, the secondary battery 11 can be discharged while maintaining the temperature of the secondary battery 11 within a predetermined temperature range, so that the safety can be enhanced.

Figure 7:
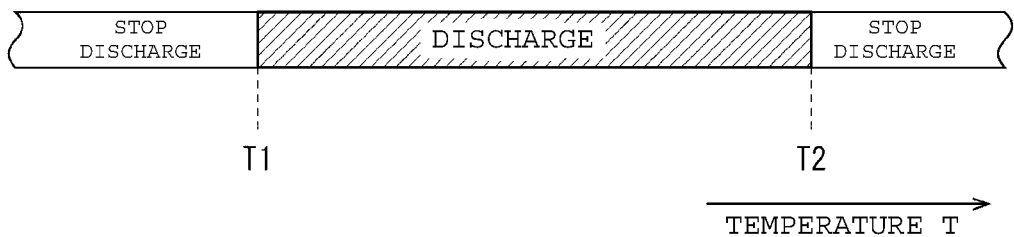
FIG. 7 is an explanatory diagram illustrating another example of the temperature range in which the discharge operation is performed.

In this example, as illustrated in FIG. 6, the microcontroller 18 does not cause the discharge circuit 20 to perform the discharge operation when the temperature of the secondary battery 11 is higher than the temperature T2; however, the present disclosure is not limited to this example. In addition, for example, as illustrated in FIG. 7, the microcontroller 18 may not cause the discharge circuit 20 to perform the discharge operation when the temperature of secondary battery 11 is lower than the temperature T1. The temperature T1 may be, for example, a lower limit value of the rated condition of the operating temperature of the secondary battery 11.

Figure 8:
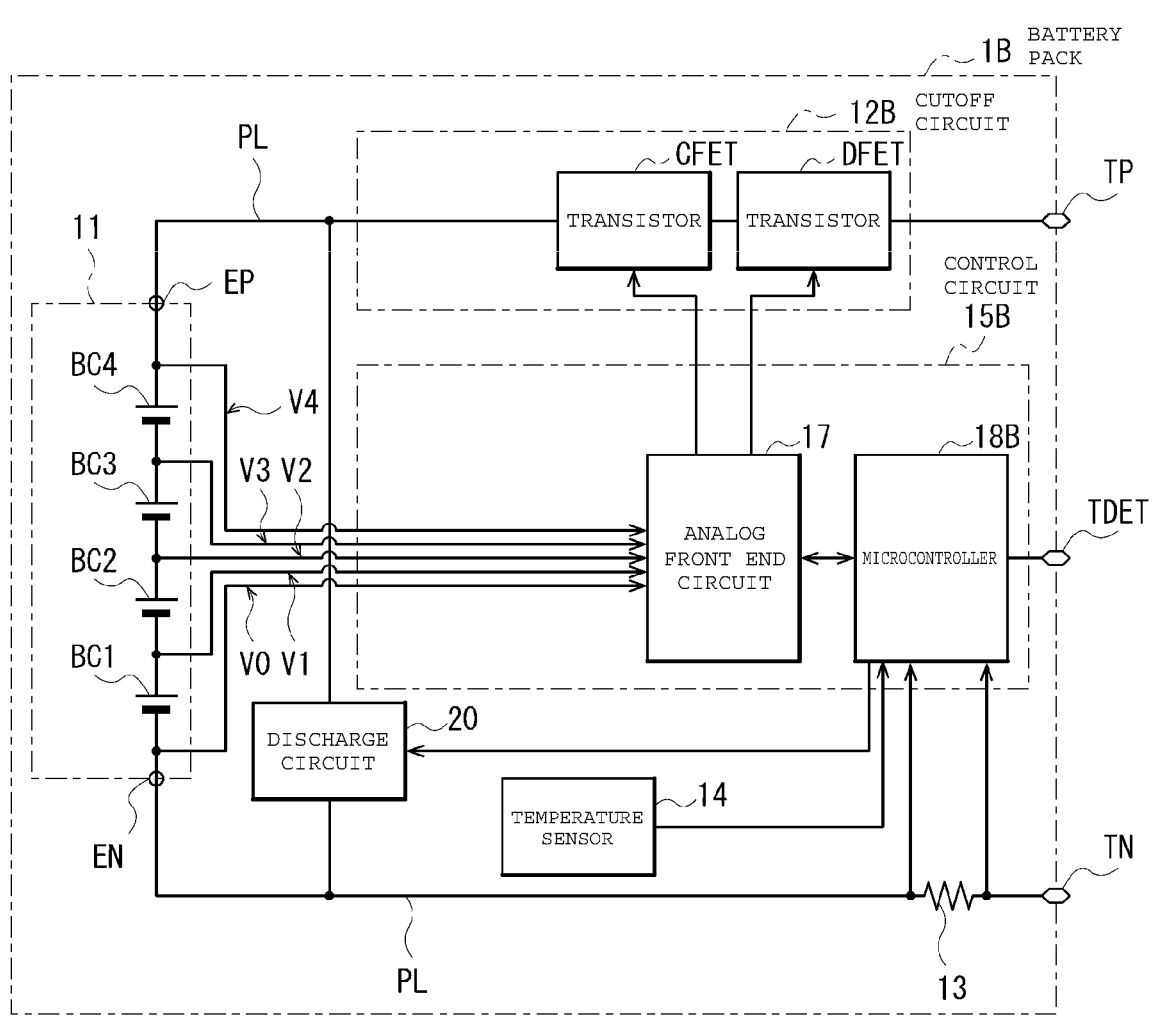
FIG. 8 is a block diagram illustrating a configuration example of the battery pack according to another variation.

In the above embodiment, although the fuse FU is provided, the present disclosure is not limited to this, and instead of this, the fuse FU may not be provided as in a battery pack 1B illustrated in FIG. 8, for example. The battery pack 1B includes a cutoff circuit 12B and a control circuit 15B.

The cutoff circuit 12B includes the transistor DFET and the transistor CFET. That is, the cutoff circuit 12B is obtained by removing the fuse FU from the cutoff circuit 12 (FIG. 1) according to the above embodiment.

The control circuit 15B includes the analog front end circuit 17 and a microcontroller 18B. That is, in the control circuit 15B, the protection circuit 16 is omitted from the control circuit 15 (FIG. 1) according to the above embodiment, and the microcontroller 18 is replaced with the microcontroller 18B.

The microcontroller 18B is configured to monitor the cell voltages of the battery cells BC1 to BC4 based on the detection results of the voltages V0 to V4 supplied from the analog front end circuit 17, monitor the charge current and the discharge current of the battery pack 1 based on the voltage between both ends of the resistance element 13, and monitor the temperature of the battery pack 1B based on the detection result of the temperature sensor 14. The microcontroller 18B monitors connection between the battery pack 1 and the device based on the voltage at the terminal TDET. Then, based on the monitoring result, the microcontroller 18B controls the operations of the transistors DFET and CFET via the analog front end circuit 17, and controls the operation of the discharge circuit 20.

The microcontroller 18B can perform non-restoration protection similarly to the microcontroller 18 (FIG. 1) according to the above embodiment. Specifically, for example, the microcontroller 18B can judge that the battery cell BC is in the deep discharge state by monitoring the cell voltages of the battery cells BC1 to BC4. For example, the microcontroller 18B can judge that a cell balance error has occurred by monitoring variations in the cell voltages of the battery cells BC1 to BC4. For example, the microcontroller 18B can judge that the battery cell BC is abnormal by monitoring the cell voltages of the battery cells BC1 to BC4 and the charge current of the battery pack 1. For example, the microcontroller 18B can judge that the temperature sensor 14 has failed by monitoring the temperature of the battery pack 1. For example, the microcontroller 18B can judge that the battery cell BC has reached the end of its life by monitoring the number of times of charging based on the cell voltages of the battery cells BC1 to BC4, and the charge current and the discharge current of the battery pack 1. Then, when detecting such an abnormality, the microcontroller 18B controls the operations of the transistors DFET and CFET to turn off the transistors DFET and CFET via the analog front end circuit 17. Thereafter, the microcontroller 18B maintains the transistors DFET and CFET in the off state. The microcontroller 18 then causes the discharge circuit 20 to perform the discharge operation.

In the above embodiment, the discharge circuit 20 includes one switch 21 and one resistance element 22; however, the present disclosure is not limited to this configuration. Instead of this, for example, a plurality of the switches 21 and a plurality of the resistance elements 22 may be provided. Hereinafter, the present variation will be described in detail.

Figure 9:
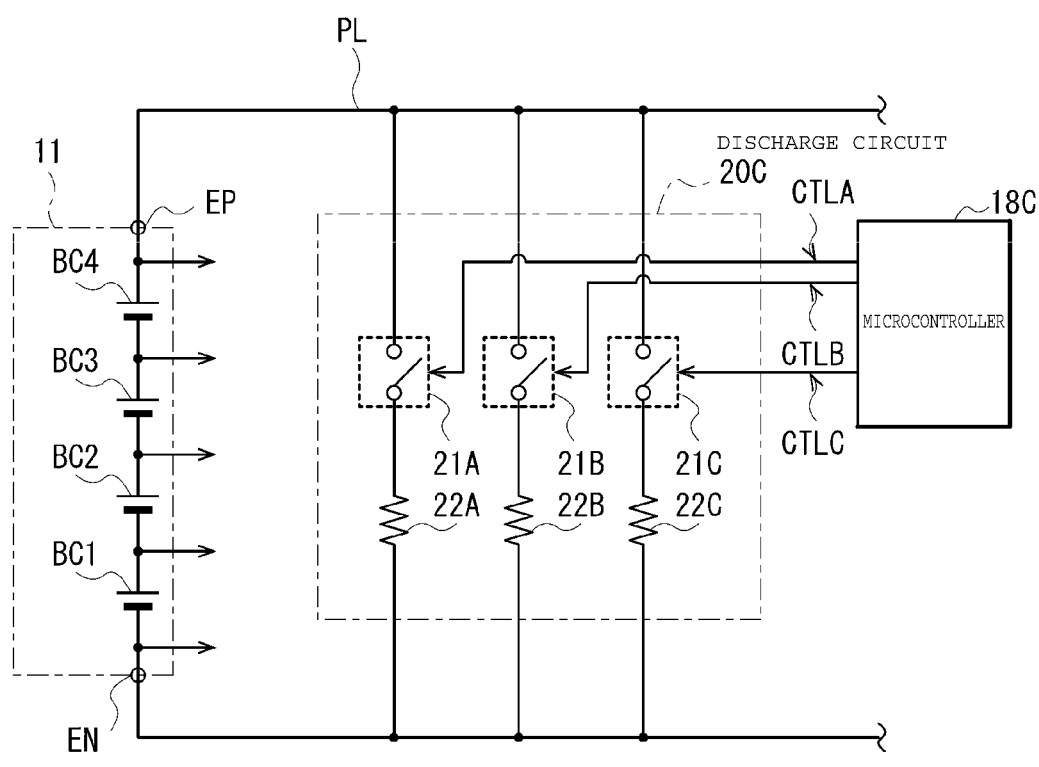
FIG. 9 is a circuit diagram illustrating a configuration example of the discharge circuit according to another variation.

FIG. 9 illustrates a configuration example of the discharge circuit 20C according to an embodiment. The discharge circuit 20C includes the three switches 21 (switches 21A, 21B, and 21C) and the three resistance elements 22 (resistance elements 22A, 22B, and 22C).

The switch 21A is configured to be able to be turned on and off based on a control signal CTLA supplied from a microprocessor (microcontroller 18C) according to the present variation. One end of the switch 21A is connected to the positive electrode EP of the secondary battery 11, and the other end of the switch 21A is connected to the resistance element 22A. One end of the resistance element 22A is connected to the other end of the switch 21A, and the other end of the resistance element 22A is connected to the negative electrode EN of the secondary battery 11. The switch 21B is configured to be able to be turned on and off based on a control signal CTLB supplied from the microcontroller 18C. One end of the switch 21B is connected to the positive electrode EP of the secondary battery 11, and the other end of the switch 21B is connected to the resistance element 22B. One end of the resistance element 22B is connected to the other end of the switch 21B, and the other end of the resistance element 22B is connected to the negative electrode EN of the secondary battery 11. The switch 21C is configured to be able to be turned on and off based on a control signal CTLC supplied from the microcontroller 18C. One end of the switch 21C is connected to the positive electrode EP of the secondary battery 11, and the other end of the switch 21C is connected to the resistance element 22C. One end of the resistance element 22C is connected to the other end of the switch 21C, and the other end of the resistance element 22C is connected to the negative electrode EN of the secondary battery 11.

In this example, the resistance value of the resistance element 22A is set to, for example, the same value as the resistance value of the resistance element 22 (FIG. 2) according to the above embodiment. The resistance value of the resistance element 22B is set to a value smaller than the resistance value of the resistance element 22A. The resistance value of the resistance element 22C is set to a value smaller than the resistance value of the resistance element 22B. When the discharge circuit 20C performs the discharge operation, one of the switches 21A, 21B, and 21C is controlled to be turned on. In this manner, the discharge circuit 20C constitutes a variable resistance circuit capable of changing the resistance value.

Figure 10:
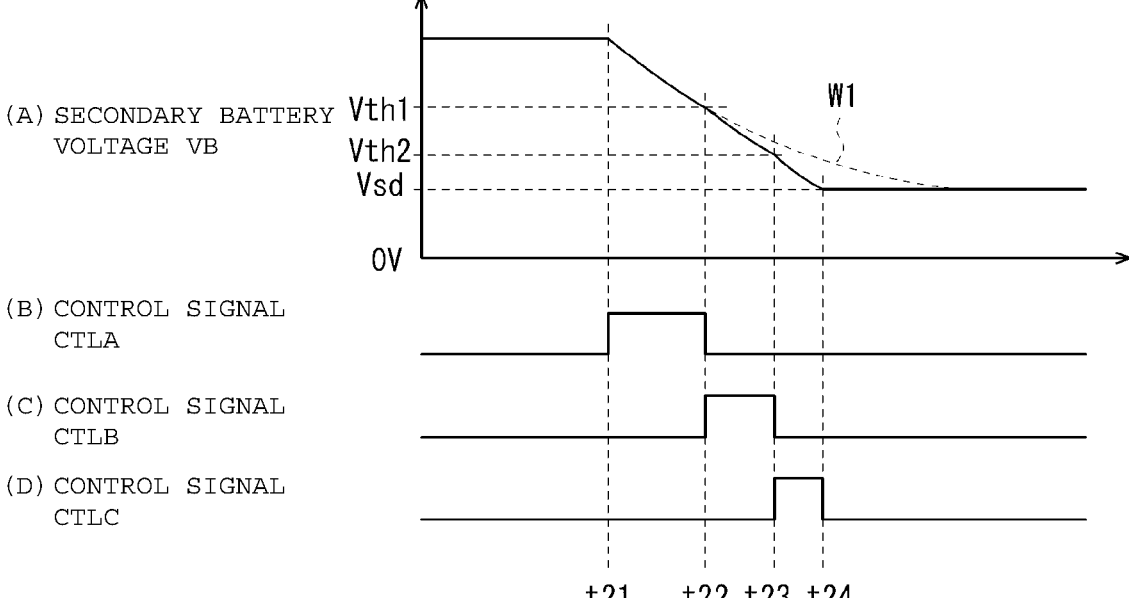
FIG. 10 is a timing waveform diagram illustrating an operation example of the discharge circuit illustrated in FIG. 9.

FIG. 10 illustrates an example of the discharge operation of the discharge circuit 20C, in which (A) illustrates a waveform of the voltage (secondary battery voltage VB) between the positive electrode EP and the negative electrode EN of the secondary battery 11, (B) illustrates a waveform of the control signal CTLA, (C) illustrates a waveform of the control signal CTLB, and (D) illustrates a waveform of the control signal CTLC. In FIG. 10, a characteristic indicated by a reference sign W1 indicates the characteristic (FIG. 4) in the above embodiment.

In this example, the microcontroller 18C detects an abnormality of the battery pack 1 based on the monitoring result, and sets the operation mode M to the non-restoration protection mode M5. Then, the microcontroller 18C causes the cutoff circuit 12 to cut off a current, and changes the control signal CTLA from the low level to the high level at timing t21 (FIG. 10(B)). As a result, the switch 21A of the discharge circuit 20C is turned on, a current flows through the positive electrode EP of the secondary battery 11, the switch 21A, the resistance element 22A, and the negative electrode EN of the secondary battery 11 in this order, and the discharge of the secondary battery 11 starts. As a result, the secondary battery voltage VB decreases as time elapses (FIG. 10(A)).

When the secondary battery voltage VB falls below a threshold voltage Vth1 at timing t22, the microcontroller 18C changes the control signal CTLA from the high level to the low level, and changes the control signal CTLB from the low level to the high level (FIGS. 10(B) and 10(C)). As a result, while the switch 21A of the discharge circuit 20C is turned off, the switch 21B is turned on, a current flows through the positive electrode EP of the secondary battery 11, the switch 21B, the resistance element 22B, and the negative electrode EN of the secondary battery 11 in this order, and the discharge of the secondary battery 11 proceeds. As a result, the secondary battery voltage VB decreases as time elapses (FIG. 10(A)). Since the resistance value of the resistance element 22B is smaller than the resistance value of the resistance element 22A, the degree of change in the secondary battery voltage VB is larger than that in the above embodiment.

When the secondary battery voltage VB falls below a threshold voltage Vth2 at timing t23, the microcontroller 18C changes the control signal CTLB from the high level to the low level, and changes the control signal CTLC from the low level to the high level (FIGS. 10(C) and 10(D)). As a result, while the switch 21B of the discharge circuit 20C is turned off, the switch 21C is turned on, a current flows through the positive electrode EP of the secondary battery 11, the switch 21C, the resistance element 22C, and the negative electrode EN of the secondary battery 11 in this order, and the discharge of the secondary battery 11 proceeds. As a result, the secondary battery voltage VB decreases as time elapses (FIG. 10(A)). Since the resistance value of the resistance element 22C is smaller than the resistance value of the resistance element 22B, the degree of change in the secondary battery voltage VB can be made larger than that in the above embodiment.

When the secondary battery voltage VB reaches the shutdown voltage Vsd at timing t24, the microcontroller 18C changes the operation mode M to the shutdown mode M4 and changes the control signal CTLC from the high level to the low level (FIG. 10(D)).

In this manner, the discharge circuit 20C discharges the secondary battery 11 in the period of the timings t21 to t24.

In the battery pack 1, the discharge circuit 20C includes the variable resistance circuit capable of changing the resistance value. When detecting an abnormality, the control circuit 15 including the microcontroller 18C changes the resistance value based on the secondary battery voltage VB which is the voltage between the positive electrode EP and the negative electrode EN of the secondary battery 11. In particular, the control circuit 15 sets the resistance value to the first resistance value when the secondary battery voltage VB is the first voltage, and sets the resistance value to the second resistance value lower than the first resistance value when the secondary battery voltage VB is the second voltage lower than the first voltage. Thus, in the battery pack 1, the secondary battery 11 can be discharged in a short time as compared with the case of the above embodiment.

In this example, the three resistance elements 22A, 22B, and 22C are provided; however, the present disclosure is not limited thereto, and instead of this, two resistance elements may be provided, or four or more resistance elements may be provided.

In this example, the resistance value of the discharge circuit 20C is changed by making the resistance values of the resistance elements 22A, 22B, and 22C different from each other and turning on any one of the switches 21A, 21B, and 21C; however, the present disclosure is not limited thereto. Instead of this, for example, the resistance value of the discharge circuit 20C may be changed by making the resistance values of the resistance elements 22A, 22B, and 22C equal to each other and changing the number of switches 21 to be turned on among the switches 21A, 21B, and 21C. In this case, for example, by increasing the number of switches 21 to be turned on among the switches 21A, 21B, and 21C, the resistance value of the discharge circuit 20C can be reduced.

In this example, the switch 21A and the resistance element 22A are connected in series, the switch 21B and the resistance element 22B are connected in series, the switch 21B and the resistance element 22B are connected in series, these three circuits are connected in parallel, and one of the switches 21A to 21C is turned on to select the resistance element to be used among the resistance elements 22A to 22C; however, the present disclosure is not limited thereto. Alternatively, the resistance elements 22A, 22B, and 22C may be connected in series, and two of these resistance elements 22A to 22C may be bypassed to select the resistance element to be used.

In the above embodiment, the microcontroller 18 controls the operation of the discharge circuit 20 using the control signal CTL; however, the control signal CTL may be, for example, a pulse width modulation (PWM) signal. Hereinafter, the present variation will be described in detail according to an embodiment.

Figure 11:
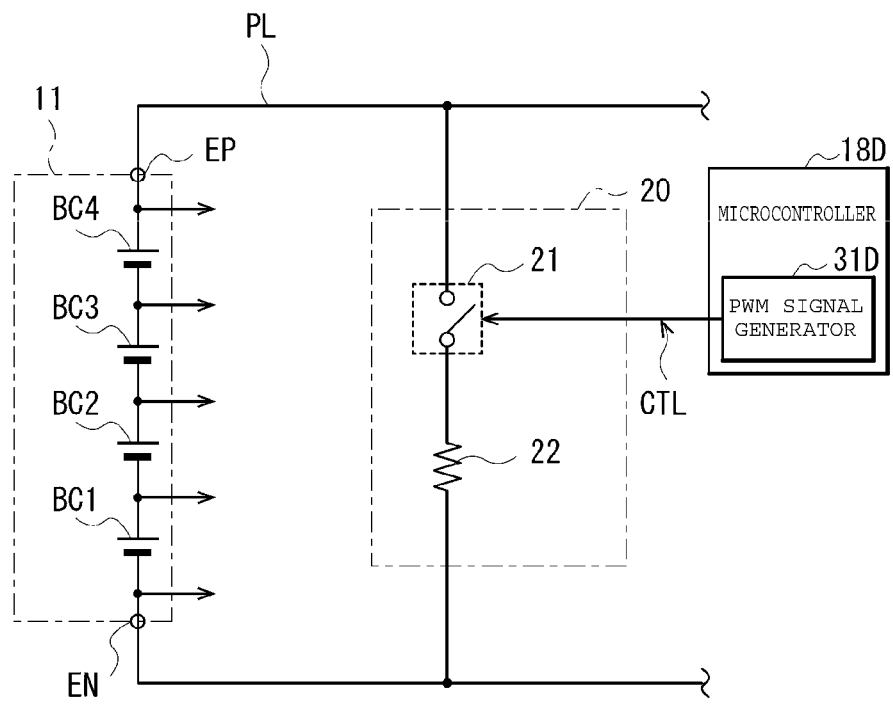
FIG. 11 is a circuit diagram illustrating a configuration example of the discharge circuit according to another variation.

FIG. 11 illustrates a configuration example of a microcontroller 18D according to the present variation. FIG. 11 also illustrates the secondary battery 11 and the discharge circuit 20. The microcontroller 18D includes a PWM signal generator 31D. The PWM signal generator 31D is configured to generate the control signal CTL that is the PWM signal. The PWM signal generator 31D can change a duty ratio of the control signal CTL.

Figure 12:
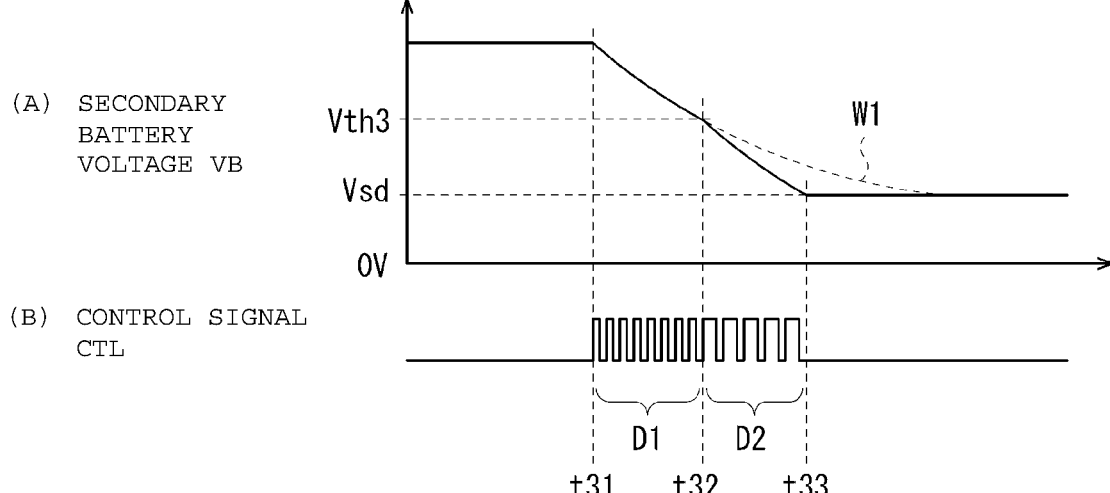
FIG. 12 is a timing waveform diagram illustrating an operation example of the discharge circuit illustrated in FIG. 10.

FIG. 12 illustrates an example of the discharge operation of the discharge circuit 20 according to the present variation.

In this example, the microcontroller 18D detects an abnormality of the battery pack 1 based on the monitoring result, and sets the operation mode M to the non-restoration protection mode M5. Then, the microcontroller 18D causes the cutoff circuit 12 to cut off a current, and starts outputting the control signal CTL whose duty ratio is a duty ratio D1 at timing t31 (FIG. 12(B)). In a period in which the control signal CTL is at the high level, the switch 21 of the discharge circuit 20 is turned on, a current flows through the positive electrode EP of the secondary battery 11, the switch 21, the resistance element 22, and the negative electrode EN of the secondary battery 11 in this order. On the other hand, in a period in which the control signal CTL is at the low level, the switch 21 of the discharge circuit 20 is turned off, and no current flows. In this way, in the discharge circuit 20, the secondary battery 11 is discharged, and the secondary battery voltage VB decreases as time elapses (FIG. 12(A)).

When the secondary battery voltage VB falls below a threshold voltage Vth3 at timing t32, the microcontroller 18D starts outputting the control signal CTL whose duty ratio is a duty ratio D2 (FIG. 12(B)). The duty ratio D2 is larger than the duty ratio D1. In a period in which the control signal CTL is at the high level, the switch 21 of the discharge circuit 20 is turned on, a current flows through the positive electrode EP of the secondary battery 11, the switch 21, the resistance element 22, and the negative electrode EN of the secondary battery 11 in this order. On the other hand, in a period in which the control signal CTL is at the low level, the switch 21 of the discharge circuit 20 is turned off, and no current flows. In this way, in the discharge circuit 20, the secondary battery 11 is discharged, and the secondary battery voltage VB decreases as time elapses (FIG. 12(A)). Since the duty ratio D2 is larger than the duty ratio D1, the degree of change in the secondary battery voltage VB can be made larger than that in the above embodiment.

When the secondary battery voltage VB reaches the shutdown voltage Vsd at timing t33, the microcontroller 18D changes the operation mode M to the shutdown mode M4 and sets the control signal CTL to the low level (FIG. 12(D)). In this manner, the discharge circuit 20 discharges the secondary battery 11 in the period of the timings t23 to t33.

In the battery pack 1, the discharge circuit 20 includes the resistance element 22 and the switch 21 connected in series with the resistance element 22. When detecting an abnormality, the control circuit 15 including the microcontroller 18D controls the operation of the switch 21 using the PWM signal based on the secondary battery voltage VB which is the voltage between the positive electrode EP and the negative electrode EN of the secondary battery 11. In particular, the control circuit 15 sets the duty ratio of the PWM signal to a first value when the secondary battery voltage VB is the first voltage, and sets the duty ratio to a second value larger than the first value when the secondary battery voltage VB is the second voltage lower than the first voltage. Thus, in the battery pack 1, the secondary battery 11 can be discharged in a short time as compared with the case of the above embodiment.

In this example, the microcontroller 18D switches the duty ratio of the control signal CTL between the duty ratio D1 and the duty ratio D2; however, the present disclosure is not limited thereto, and instead of this, for example, the duty ratio may be switched among three or more duty ratios.

Two or more of these variations may be combined according to an embodiment.

Although the present technology has been described with reference to the embodiments, the present technology is not limited to these embodiments and the like, and various modifications can be made.

For example, in the above embodiment and the like, the four battery cells BC are provided as illustrated in FIG. 1; however, the present disclosure is not limited thereto, and one battery cell BC may be provided, or two, three, or five or more battery cells BC may be provided.

Since the effects described in the present specification are merely examples, the effects of the present disclosure are not limited to the effects described in the present specification. Thus, other effects regarding the present disclosure may be obtained.

The present disclosure includes the following aspects according to an embodiment.

<1>

A battery pack including:

a secondary battery provided in a power supply path and including a positive electrode and a negative electrode;

a first terminal connected to one end of the power supply path;

a second terminal connected to the other end of the power supply path;

a cutoff circuit provided in the power supply path and cutting off a current flowing through the power supply path;

a discharge circuit connected to the positive electrode of the secondary battery and the negative electrode of the secondary battery and discharging the secondary battery; and a control circuit monitoring the secondary battery and causing the cutoff circuit to cut off the current and causing the discharge circuit to discharge the secondary battery when an abnormality is detected based on a monitoring result.

<2>

The battery pack according to <1>, wherein the cutoff circuit includes a fuse, and the control circuit brings the fuse into a disconnected state when the abnormality is detected.

<3>

The battery pack according to <1> or <2>, wherein
the cutoff circuit includes a cutoff switch to be turned on
and off, and
the control circuit maintains the cutoff switch in an off
state after detecting the abnormality.

<4>

The battery pack according to any one of <1> to <3>,
wherein
the control circuit
operates based on power supplied from the secondary
battery, and
stops an operation of the discharge circuit when a sec-
ondary battery voltage, which is a voltage between the
positive electrode and the negative electrode of the
secondary battery, becomes equal to or less than a
predetermined voltage.

<5>

The battery pack according to any one of <1> to <4>,
wherein
the secondary battery includes a battery cell,
the control circuit
monitors a cell voltage of the battery cell and
monitors a current flowing through the secondary bat-
tery.

<6>

The battery pack according to <5>, wherein
the abnormality includes one or more of
a case in which the battery cell is in a greatly overcharged
state,
a case in which the battery cell is in a deep discharge state,
a case in which the cell voltage of the battery cell
decreases during charging,
a case in which a component included in the battery pack
has failed, and
a case in which the number of times of charging or
discharging the secondary battery is equal to or more
than a predetermined number of times.

<7>

The battery pack according to <5>, wherein
the secondary battery includes a plurality of the battery
cells, and
the control circuit monitors a cell voltage of each of the
plurality of battery cells.

<8>

The battery pack according to <7>, wherein the abnor-
mality includes a large variation in cell voltage of each of the
plurality of battery cells.

<9>

The battery pack according to any one of <1> to <8>,
wherein
the discharge circuit includes a first resistance element
and a switch connected in series with the first resistance
element, and
the control circuit causes the discharge circuit to discharge
the secondary battery by turning on the switch when the
abnormality is detected.

<10>

The battery pack according to any one of <1> to <8>,
wherein
the discharge circuit includes a variable resistance circuit
changing a resistance value, and
the control circuit changes the resistance value based on
the secondary battery voltage that is the voltage
between the positive electrode and the negative elec-
trode of the secondary battery when the abnormality is
detected.

<11>

The battery pack according to <10>, wherein
the control circuit
sets the resistance value to a first resistance value when
the secondary battery voltage is a first voltage, and
sets the resistance value to a second resistance value
lower than the first resistance value when the secondary
battery voltage is a second voltage lower than the first
voltage.

<12>

The battery pack according to any one of <1> to <8>,
wherein the discharge circuit includes a first resistance
element and a switch connected in series with the first
resistance element, and the control circuit controls operation
of the switch by using a PWM signal based on the secondary
battery voltage that is the voltage between the positive
electrode and the negative electrode of the secondary battery
when the abnormality is detected.

<13>

The battery pack according to <12>, wherein
the control circuit
sets a duty ratio of the PWM signal to a first value when
the secondary battery voltage is a first voltage, and
sets the duty ratio to a second value larger than the first
value when the secondary battery voltage is a second
voltage lower than the first voltage.

<14>

The battery pack according to any one of <1> to <13>,
further including a temperature sensor detecting a tempera-
ture of the secondary battery,
wherein when detecting the abnormality, the control cir-
cuit causes the discharge circuit to discharge the sec-
ondary battery when the temperature of the secondary
battery is within a predetermined temperature range.

<15>

A battery pack including:
a secondary battery provided in a power supply path and
including a positive electrode and a negative electrode;
a first terminal connected to one end of the power supply
path;
a second terminal connected to the other end of the power
supply path;
a cutoff circuit provided in the power supply path and
cutting off a current flowing through the power supply
path;
a discharge circuit connected to the positive electrode of
the secondary battery and the negative electrode of the
secondary battery and discharging the secondary bat-
tery;
a temperature sensor detecting a temperature of the sec-
ondary battery;
a second resistance element provided in the power supply
path; and
a control circuit monitoring the secondary battery, a
detection result of the temperature sensor, and a voltage
between both ends of the second resistance element,
causing the cutoff circuit to cut off the current and
causing the discharge circuit to discharge the secondary
battery when an abnormality is detected based on a
monitoring result.

It should be understood that various changes and modi-
fications to the embodiments described herein will be appar-
ent to those skilled in the art. Such changes and modifica-
tions can be made without departing from the spirit and
scope of the present subject matter and without diminishing its intended advantages. It is therefore intended that such changes and modifications be covered by the appended claims.

What is claimed is:

1. A battery pack comprising:
a secondary battery provided in a power supply path and including a positive electrode and a negative electrode;
a first terminal connected to one end of the power supply path;
a second terminal connected to the other end of the power supply path;
a cutoff circuit provided in the power supply path and cutting off a current flowing through the power supply path;
a discharge circuit connected to the positive electrode of the secondary battery and the negative electrode of the secondary battery and discharging the secondary battery; and
a control circuit monitoring the secondary battery and causing the cutoff circuit to cut off the current and causing the discharge circuit to discharge the secondary battery when an abnormality is detected based on a monitoring result.

2. The battery pack according to claim 1, wherein the cutoff circuit includes a fuse, and
the control circuit brings the fuse into a disconnected state when the abnormality is detected.

3. The battery pack according to claim 1, wherein the cutoff circuit includes a cutoff switch to be turned on and off, and
the control circuit maintains the cutoff switch in an off state after detecting the abnormality.

4. The battery pack according to claim 1, wherein the control circuit
operates based on power supplied from the secondary battery, and
stops an operation of the discharge circuit when a secondary battery voltage, which is a voltage between the positive electrode and the negative electrode of the secondary battery, becomes equal to or less than a predetermined voltage.

5. The battery pack according to claim 1, wherein the secondary battery includes a battery cell,
the control circuit
monitors a cell voltage of the battery cell and
monitors a current flowing through the secondary battery.

6. The battery pack according to claim 5, wherein the abnormality includes one or more of
a case in which the battery cell is in a greatly overcharged state,
a case in which the battery cell is in a deep discharge state,
a case in which the cell voltage of the battery cell decreases during charging,
a case in which a component included in the battery pack has failed, and
a case in which the number of times of charging or discharging the secondary battery is equal to or more than a predetermined number of times.

7. The battery pack according to claim 5, wherein the secondary battery includes a plurality of the battery cells, and
the control circuit monitors a cell voltage of each of the plurality of battery cells.

8. The battery pack according to claim 7, wherein the abnormality includes a large variation in cell voltage of each of the plurality of battery cells.

9. The battery pack according to claim 1, wherein the discharge circuit includes a first resistance element and a switch connected in series with the first resistance element, and
the control circuit causes the discharge circuit to discharge the secondary battery by turning on the switch when the abnormality is detected.

10. The battery pack according to claim 1, wherein the discharge circuit includes a variable resistance circuit changing a resistance value, and
the control circuit changes the resistance value based on a secondary battery voltage that is a voltage between the positive electrode and the negative electrode of the secondary battery when the abnormality is detected.

11. The battery pack according to claim 10, wherein the control circuit
sets the resistance value to a first resistance value when the secondary battery voltage is a first voltage, and
sets the resistance value to a second resistance value lower than the first resistance value when the secondary battery voltage is a second voltage lower than the first voltage.

12. The battery pack according to claim 1, wherein the discharge circuit includes a first resistance element and a switch connected in series with the first resistance element, and
the control circuit controls operation of the switch by using a PWM signal based on a secondary battery voltage that is a voltage between the positive electrode and the negative electrode of the secondary battery when the abnormality is detected.

13. The battery pack according to claim 12, wherein the control circuit
sets a duty ratio of the PWM signal to a first value when the secondary battery voltage is a first voltage, and
sets the duty ratio to a second value larger than the first value when the secondary battery voltage is a second voltage lower than the first voltage.

14. The battery pack according to claim 1, further comprising a temperature sensor detecting a temperature of the secondary battery,
wherein when detecting the abnormality, the control circuit causes the discharge circuit to discharge the secondary battery when the temperature of the secondary battery is within a predetermined temperature range.

15. A battery pack comprising:
a secondary battery provided in a power supply path and including a positive electrode and a negative electrode;
a first terminal connected to one end of the power supply path;
a second terminal connected to the other end of the power supply path;
a cutoff circuit provided in the power supply path and cutting off a current flowing through the power supply path;
a discharge circuit connected to the positive electrode of the secondary battery and the negative electrode of the secondary battery and discharging the secondary battery;
a temperature sensor detecting a temperature of the secondary battery;
a second resistance element provided in the power supply path; and
a control circuit monitoring the secondary battery, a detection result of the temperature sensor, and a voltage between both ends of the second resistance element, causing the cutoff circuit to cut off the current and causing the discharge circuit to discharge the secondary battery when an abnormality is detected based on a monitoring result.

* * * * *